United States Patent
Certain et al.

(10) Patent No.: US 10,479,494 B2
(45) Date of Patent: Nov. 19, 2019

(54) ROTORCRAFT TAIL ROTOR, A ROTORCRAFT FITTED WITH SUCH A TAIL ROTOR, AND A METHOD OF STATICALLY AND/OR DYNAMICALLY BALANCING A ROTORCRAFT TAIL ROTOR

(71) Applicant: AIRBUS HELICOPTERS, Marignane (FR)

(72) Inventors: Bernard Certain, Aix en Provence (FR); Jeremy Jouve, Senas (FR)

(73) Assignee: AIRBUS HELICOPTERS, Marignane (FR)

( * ) Notice: Subject to any disclaimer, the term of this patent is extended or adjusted under 35 U.S.C. 154(b) by 213 days.

(21) Appl. No.: 14/950,399

(22) Filed: Nov. 24, 2015

(65) Prior Publication Data
US 2016/0152332 A1 Jun. 2, 2016

(30) Foreign Application Priority Data

Nov. 28, 2014 (FR) ..................... 14 02707

(51) Int. Cl.
*B64C 27/51* (2006.01)
*B64C 27/82* (2006.01)
(Continued)

(52) U.S. Cl.
CPC ............ *B64C 27/82* (2013.01); *B64C 27/51* (2013.01); *F16F 15/1428* (2013.01); *B64C 2027/005* (2013.01)

(58) Field of Classification Search
None
See application file for complete search history.

(56) References Cited

U.S. PATENT DOCUMENTS 4,239,455 A * 12/1980 Broekhuizen ......... B64C 27/001
416/145
4,239,456 A * 12/1980 Joglekar ............... B64C 27/001
416/145
(Continued)

FOREIGN PATENT DOCUMENTS

CN 102285448 A 12/2011
EP 0058117 8/1982
(Continued)

OTHER PUBLICATIONS

Mike Broderick, Helicopter Tail Rotors III, Air Maintenance Update Magazine, "http://amumagazine.com/?p=2442".*
(Continued)

*Primary Examiner* — Carlos A Rivera
*Assistant Examiner* — Theodore C Ribadeneyra
(74) *Attorney, Agent, or Firm* — Brooks Kushman P.C.

(57) ABSTRACT

A rotorcraft tail rotor comprising at least two blade elements, each blade element being suitable for pivoting about a collective pitch variation axis Z in order to vary the collective pitch of each blade element of the tail rotor, each blade element including at least one compensation weight comprising a projection emerging substantially perpendicularly to a main inertia axis of the blade element, the main inertia axis being parallel to a longitudinal direction of the blade element. In the invention, the tail rotor is wherein the compensation weight includes a deformable portion that is movable relative to the projection in a plane P that is parallel to the main inertia axis of the blade element.

20 Claims, 2 Drawing Sheets

(51) Int. Cl.
   *F16F 15/14*   (2006.01)
   *B64C 27/00*   (2006.01)

(56) References Cited

U.S. PATENT DOCUMENTS

| | | | |
|---|---|---|---|
| 4,431,148 A | | 2/1984 | Mouille |
| 4,527,951 A | * | 7/1985 | Trier .................... B64C 27/001 |
| | | | 188/378 |
| 5,542,818 A | | 8/1996 | Monvaillier et al. |
| 6,125,977 A | * | 10/2000 | Nekomoto .............. E04B 1/985 |
| | | | 188/378 |
| 8,899,928 B2 | | 12/2014 | Girard et al. |
| 2011/0268573 A1 | | 11/2011 | Girard et al. |

FOREIGN PATENT DOCUMENTS

| | | |
|---|---|---|
| FR | 2435391 | 4/1980 |
| FR | 2530216 | 1/1984 |
| FR | 2719554 | 11/1995 |
| FR | 2959484 | 11/2011 |
| WO | 9606006 | 2/1996 |

OTHER PUBLICATIONS

First Office Action for Chinese Application No. 201510846200.3, dated May 2, 2017, 5 Pages.
French Search Report for French Application No. FR 1402707, Completed by the French Patent Office on Jul. 23, 2015, 7 Pages.
Second Office Action for Chinese Application No. 201510846200.3, dated Jan. 4, 2018, 8 Pages.

* cited by examiner

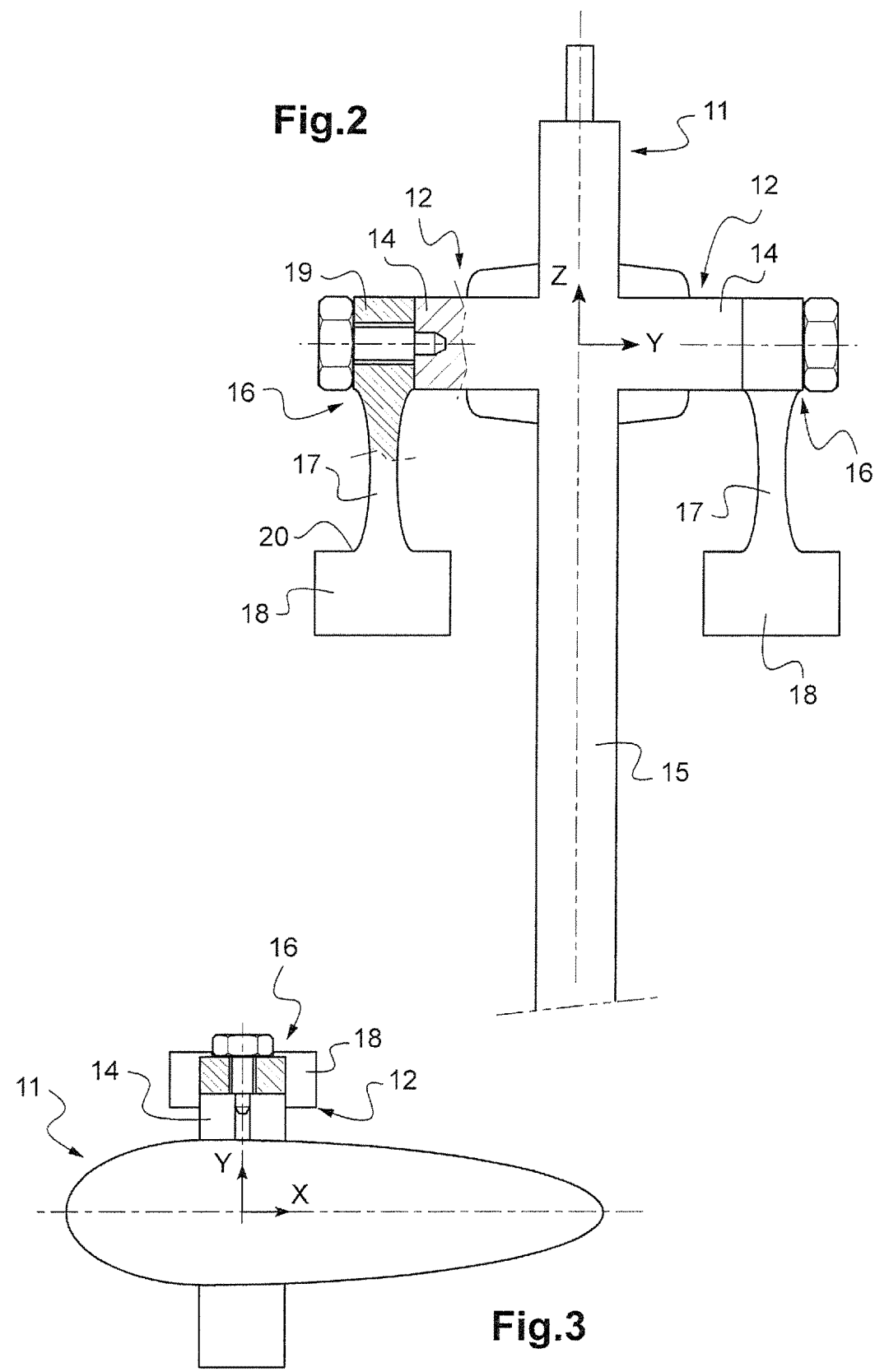

ROTORCRAFT TAIL ROTOR, A ROTORCRAFT FITTED WITH SUCH A TAIL ROTOR, AND A METHOD OF STATICALLY AND/OR DYNAMICALLY BALANCING A ROTORCRAFT TAIL ROTOR

CROSS REFERENCE TO RELATED APPLICATION

This application claims priority to French patent application No. FR 14 02707 filed on Nov. 28, 2014, the disclosure of which is incorporated in its entirety by reference herein.

BACKGROUND OF THE INVENTION (1) Field of the Invention

The present invention relates to a rotorcraft tail rotor. The term rotorcraft is used in this application to describe any type of rotary wing aircraft, such as in particular helicopters.

(2) Description of Related Art

In current usage, such a tail rotor is also called an "anti-torque" rotor since it makes it possible to exert a torque for opposing the rotary movement in yaw produced by a main rotor, which provides the rotorcraft with lift and propulsion.

Thus, the tail rotor of a rotorcraft generally has a substantially horizontal axis of rotation and it may either be integrated in the fuselage of the rotorcraft, or else it may be external thereto. When the rotor is integrated in the fuselage, it is then referred to by the terms ducted tail rotor or Fenestron®.

In addition, the tail rotor may comprise at least two blades arranged symmetrically about the axis of rotation of the rotor. Each blade is movable in pivoting about an axis referred to as the "pitch" axis in order to vary the angle of incidence of the blades relative to the surrounding air and thus vary the thrust of the rotor. Such variation can in particular be carried out when the pilot of the aircraft wishes to modify the yaw angle described by the aircraft, or more simply to increase the power of the main rotor, with a consequent need to increase the value of the yaw torque.

Furthermore, in order to vary the pitch angle, the pilot actuates pedals of a rudder bar making it possible to actuate the rod of a tail rotor servo-control that is hydraulically connected to a control plate. Such a control plate can be moved in translation in a direction parallel to the axis of rotation of the rotor. Moving the pedals, from one abutment to another, varies the pitch of the blades of the antitorque rotor, by means of each rod connecting said plate to each blade, through an angle that may for example lie in the range −8° and +23° about a flat position of 0°.

In flight, as soon as the thrust of the rotor is no longer zero, i.e. when the pitch angle is different from 0°, torque for returning the blades to a flat position is exerted on the blades and tends to return the pitch angle to 0°. When a rotor is in rotation, the centrifugal forces acting on each blade element cause any pitch variation to be opposed, and the blades to be returned to the plane of rotation. In order to calculate the resulting torque M being exerted on the blades, reference may be made to the known literature on the subject, and for example, consideration may be given to a mass element dm of the blade, situated at a distance r' from the center of the rotor. Then, the centrifugal force element acting on that mass element has the value:

$$dF = \Omega^2 \cdot r' \cdot dm$$

where $\Omega$ is the angular velocity of the rotor.

This force element can then be resolved into a component $dF_Z$ parallel to the pitch axis and a component $dF_1$ perpendicular to the pitch axis. The component $dF_1$ then has the value:

$$dF_1 = dF \cdot \sin \varphi = \Omega^2 \cdot r' \cdot \sin \varphi \cdot dm = \Omega^2 \cdot x \cdot dm$$

where x is the distance of the blade element under consideration from the pitch axis.

The component $dF_1$ is then situated at a distance y from the plane for which the general pitch angle θ is zero, thus giving rise to a torque element dM tending to return the blade to a flat position, i.e. in a plane xOz.

However, if it is accepted that the center of gravity G of the section of the blade is situated on the pitch axis, the value of that torque element is given by the expression:

$$dM = \Omega^2 \cdot x \cdot y \cdot dm$$

and the resulting torque M is written:

$$M = \Omega^2 \cdot \int_{-C1}^{C2} x \cdot y \cdot dm$$

with C1 and C2 corresponding respectively to the orthogonal projections onto an axis Ox of a leading edge of the blade section at the point G and of a trailing edge of blade section at the point G.

With hydraulic power assistance, and more particularly by means of the servo-control, the "return-to-flat" effect of the rotor can be countered so as to eliminate the reversibility of the command. However, in the event of failure of such hydraulic assistance, as may for example result from a leak in the hydraulic system or from a failure of a hydraulic pump, the force necessary to operate the pedals suddenly becomes very considerable.

For that reason, an additional hydraulic safety device, referred to as a yaw "force compensator" is installed, along with the servo-control, which makes it possible to offload the major portion of the aerodynamic force feedback generated by the tail rotor. Such a force compensator makes it possible to generate a force opposing the return-to-flat force being exerted on the blades. The force compensator thus comprises a hydraulic pressure accumulator that is independent from the main hydraulic assistance system and a control lever for multiplying the movement stroke of a piston of an actuator that is connected hydraulically to the pressure accumulator in order to create a "spring having a negative slope".

However, such a force compensator also incorporates numerous hydraulic members that can also be subjected to damage. A leakage in the force compensator would then prevent production of the force necessary for opposing the return-to-flat force.

That could therefore result in blocking of the system for controlling pitch variation of the tail rotor. Specifically, in the event of simultaneous malfunctions of the hydraulic assistance and of the force compensator, the forces required to enable the pilot to modify the pitch of the blades of the tail rotor are then too great and they prevent the pilot from varying the pitch of the blades of the tail rotor by using the pedals.

Thus, a first object of the invention is to limit possible causes of control over the pitch angle of a tail rotor becoming blocked, and thus to improve rotorcraft safety.

In addition, with increasingly powerful aircraft engines, it has become necessary to increase the surface area of the blades of the tail rotor, e.g. by adding "tabs" to the trailing edge of each blade. This consists in adding elements to the trailing edge, which elements extend a few centimeters in the chord direction and occupy a longitudinal fraction of the span. This increase in the surface area of the blades thus generates a considerable increase in the static and dynamic force transmitted by the blades to a rotor head.

In order to reduce these forces, the root of each blade is fitted with two compensation weights emerging symmetrically substantially perpendicularly to a main inertia axis of each blade, or more simply to the longitudinal mid-plane defined by each blade. Those compensation weights serve to create a moment opposing the return-to-flat moment of the blades and thus to reduce the forces required to control the pitch angle. Each blade element is thus stabilized, regardless of the pitch angle of the rotor.

Such compensation weights are more generally referred to as "Chinese weights". They thus co-operate with each blade to form a rigid single-piece unit, and in particular they are described by the Applicant in document FR 2 719 554. Indeed, that document describes the compensation weights as being stationary elements forming projections on both sides of a longitudinal mid-plane of the blade.

However, although such Chinese weights make it possible to limit static force, they do not make it possible to reduce the dynamic force transmitted by the blades to a rotor head. Such constraints may then lead to reducing the lifetime of the revolute joint between each blade and a hub body. Such a revolute joint is indeed formed by elements constituting the pitch hinge, formed by laminated bearings. Those bearings are constituted by a combination of metal and elastomer, and they are generally cylindrical or even conical in shape. Furthermore, they are the site of considerable mechanical stress during rotation of the tail rotor, and more particularly during stages of varying the pitch angle.

That thus results in maintenance intervals for the aircraft being shortened, in particular concerning replacement of the wear members that take up these forces. However, shortening maintenance intervals increases the cost of operating those aircraft, and commercially that is to be avoided.

In addition to Chinese weights that are stationary relative to the roots of the blades of a tail rotor, it is also known to fit a main rotor of a rotorcraft with oscillating pendulums or weights that are movable in pivoting relative to the blade roots. Such arrangements are described in particular in documents FR 2 530 216, FR 2 435 391, and FR 2 959 484 but they do not make it possible to guarantee good reduction of the static and dynamic force generated by the rotation of a tail rotor.

Indeed, the projection described in document FR 2 530 216 is formed by the casing of the shaft 6 and is thus hollow. Such a casing thus does not act as a Chinese weight in the same way as a solid projection. Furthermore, the direction of the revolute joint between the pendulum and the casing is perpendicular to the direction in which the casing emerges relative to the main inertia axis of the blade element. Such an arrangement is therefore not suitable for reducing the static and dynamic force generated by the rotation of a tail rotor.

Document FR 2 435 391 describes a main rotor of a rotorcraft provided with weights oscillating relative to a blade element. However, strictly speaking, there is no projection emerging perpendicularly to a main inertia axis of a blade element. The oscillating weights are thus directly positioned on either side of the blade element, without being spaced apart from a main inertia axis. Such an arrangement is therefore not suitable for reducing the static and dynamic forces generated by the rotation of a tail rotor in simple and optimum manner.

Document EP 0 058 117 describes a suspension for a main gearbox of a helicopter with oscillating weights connected to the fuselage by deformable portions, but it is not transposable to a rotorcraft tail rotor for the purpose of reducing the static and dynamic forces generated by the tail rotor rotating.

Furthermore, in another alternative for limiting stress in the laminated bearings, it is also possible to limit engine power, and thus aircraft speed, which is also prejudicial from a commercial point of view. However, such a solution is merely palliative and does not under any circumstances enable the problem to be resolved at its source.

A second object of the present invention is thus to provide a rotor that enables the above-mentioned limitations to be overcome, and in particular that significantly reduces the static and dynamic forces generated by the tail rotor rotating. Thus, the structural design of the tail rotor of the invention makes it possible to limit, or even to eliminate, the mechanical stress transmitted to the laminated bearings, to the pitch control rods, and to the entire drive linkage, and does so while using the engine(s) at maximum power.

In addition, as described in document EP 0 773 881, tail rotors are also known in which a gyroscopic mechanism makes it possible to vary thrust automatically. It is thus possible to stabilize the yaw torque of the helicopter in flight.

However, such a solution is mechanically complex to implement and thus generates considerable manufacturing and/or adaptation costs in comparison with current solutions involving Chinese weights, hydraulic assistance by servo-control, and/or a force compensator.

BRIEF SUMMARY OF THE INVENTION

Thus, a third object of the invention is to provide a solution that is safe, technically simple, and inexpensive and that makes it possible to limit the forces on the controls while conserving the structure of tail rotors currently on the market. The invention makes it possible, at low cost, to retrofit existing aircraft with a higher performance tail rotor.

The invention therefore relates to a rotorcraft tail rotor comprising at least two blade elements, each blade element being suitable for pivoting about a collective pitch variation axis Z in order to vary the collective pitch of each blade element of the tail rotor, each blade element including at least one compensation weight comprising a projection emerging along a transverse axis Y that is substantially perpendicular to a main inertia axis of the blade element, the main inertia axis being parallel to the axis Z.

This rotor is remarkable in that said compensation weight includes a deformable portion that is movable relative to said projection in a plane that is perpendicular to said transverse axis Y.

In other words, unlike the compensation weights described in the prior art, such a compensation weight does not form a rigid and stationary single-piece unit together with the blade element. As a function of the forces that are applied thereto, the deformable portion of the compensation weight is thus free to move in a movement plane that is parallel to the main inertia axis of the blade element. By way of example, such an inertia axis may be inscribed in a longitudinal mid-plane of symmetry of the blade when it presents a symmetrical profile between its suction side and its pressure side.

Advantageously, the deformable portion may comprise a flyweight that is movable in rotation at least in part about the transverse axis Y.

In other words, the flyweight is free to pivot about an axis that is perpendicular to the main inertia axis of the blade element and it thus describes a circular arc in a plane that is perpendicular to the transverse axis Y.

In addition, variants of the invention may be made with deformable portions of different kinds as described below.

Thus, in a first embodiment, the deformable portion may comprise a flexible strip.

Such a flexible strip thus presents a preferred direction for deforming in bending between a rest position in which the flexible strip is substantially plane and a deformed position in which one of the ends of the flexible strip is spaced apart from the plane of its rest position.

Advantageously, the flexible strip may emerge from the projection in a radial direction relative to the axis of rotation of the rotor.

In practice, the flexible strip may comprise:

a first end secured to the projection by a first joint of the rigid type; and a second end secured to the flyweight by a second joint of the rigid type.

In other words, in this example, the deformable portion is formed solely by the flexible strip, which is suitable for becoming deformed in the plane parallel to the main inertia axis of the blade. It is therefore not necessary to lubricate, or more simply, to maintain such a deformable portion since it is not the site of any friction.

In a second embodiment, the deformable portion may comprise a rigid arm.

In this variant, the rigid arm moves in the plane that is parallel to the main inertia axis without actually being deformed. It is the connection with the projection that makes it possible to obtain plane deformation of the deformable portion.

In this particular example, the rigid arm may thus comprise:

a first end constrained to revolute joint with said projection; and a second end secured to the flyweight by a second joint of the rigid type.

In other words, in this example, the deformation of the deformable portion is obtained by the hinge between the rigid arm and the projection. The flyweight thus describes a rotary movement about the axis of the revolute joint with the projection.

In a particular embodiment, the deformable portion may have a length lying in the range 0.05 meters (m) to 0.09 m.

Such a value for the length of the deformable portion corresponds substantially to the distance between the axis of rotation of the rotor and the connection point of the deformable portion. This length value is best for limiting the forces transmitted to the pitch control rods and thus makes it possible to limit the return-to-flat torque of the rotor.

Advantageously, the flyweight may have a weight lying in the range 100 grams (g) to 200 g.

Such a weight makes it possible to guarantee an ideal compromise for balancing between reducing the dynamic forces transmitted by the blades and increasing rotating mass, as a result of adding a compensation weight, and consequently increasing the centrifugal force to which the rotor is subjected. Furthermore, such a weight corresponds substantially to half the weight of a non-deformable Chinese weight that is generally used in the prior art.

The present invention also seeks to provide a rotorcraft that is remarkable in that it includes a tail rotor as described above.

As explained above, a rotorcraft fitted with this type of rotor is safer and faster, while at the same time conserving maintenance intervals that are acceptable for commercial operation.

Finally, the invention relates to a method of statically and/or dynamically balancing a rotorcraft tail rotor. Such a tail rotor comprises at least two blade elements, each blade element including at least one compensation weight comprising a projection emerging along a transverse axis Y that is substantially perpendicular to a main inertia axis of said blade element, said main inertia axis being parallel to a collective pitch variation axis Z in order to vary said collective pitch of each blade element of said tail rotor.

According to the invention, such a method is remarkable in that it comprises a step consisting in fitting the compensation weight with a deformable portion that is movable relative to the projection in a plane that is parallel to the main inertia axis of the blade element.

In other words, a tail rotor of a rotorcraft is balanced under static and/or dynamic conditions by using a compensation weight that includes a deformable portion. As described above, such a deformable portion may come in various forms such as flexible strip, or it may comprise a rigid arm and a hinge forming a revolute joint with the projection.

Advantageously, the deformable portion may comprise a flyweight that is movable in rotation at least in part about a rotation axis that is substantially perpendicular to the main inertia axis of the blade element. Thus, the position, the shape, and the weight of the flyweight may be adapted as a function of the frequency of the vibration that it is desired to attenuate, which is generally a frequency corresponding to the speed of rotation of the tail rotor.

In other words, merely replacing the flyweights enables static and/or dynamic balancing of a rotor to be achieved quickly. In addition, the same compensation weight structure can be used to balance rotors comprising blades that differ in shape and/or in number. Such a method thus makes it possible to use the same parts when designing different tail rotors, and consequently, to reduce the costs of manufacturing said rotors.

In practice, the length of the deformable portion may also be adapted as a function of the frequency of the vibration that it is desired to attenuate, i.e. advantageously the frequency corresponding to the speed of rotation of the tail rotor.

As described above, it is possible for static and/or dynamic balancing of a rotor to be achieved quickly by adapting the length of the deformable portion. By way of example, such a length corresponds to the length of a flexible strip or to the length of the rigid arm. With a rigid arm, the length of the deformable portion corresponds to the radius of rotary movement of the rigid arm.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 2 is a cross-section view in a first plane yOz perpendicular to a deformation plane P of the deformable portion and showing compensation weights in a second variant of the invention; and FIG. 3 shows a cross-section view in a second plane xOy perpendicular to the deformation plane P of the deformable portion and showing a compensation weight of the second variant of the invention.

Figure 1:
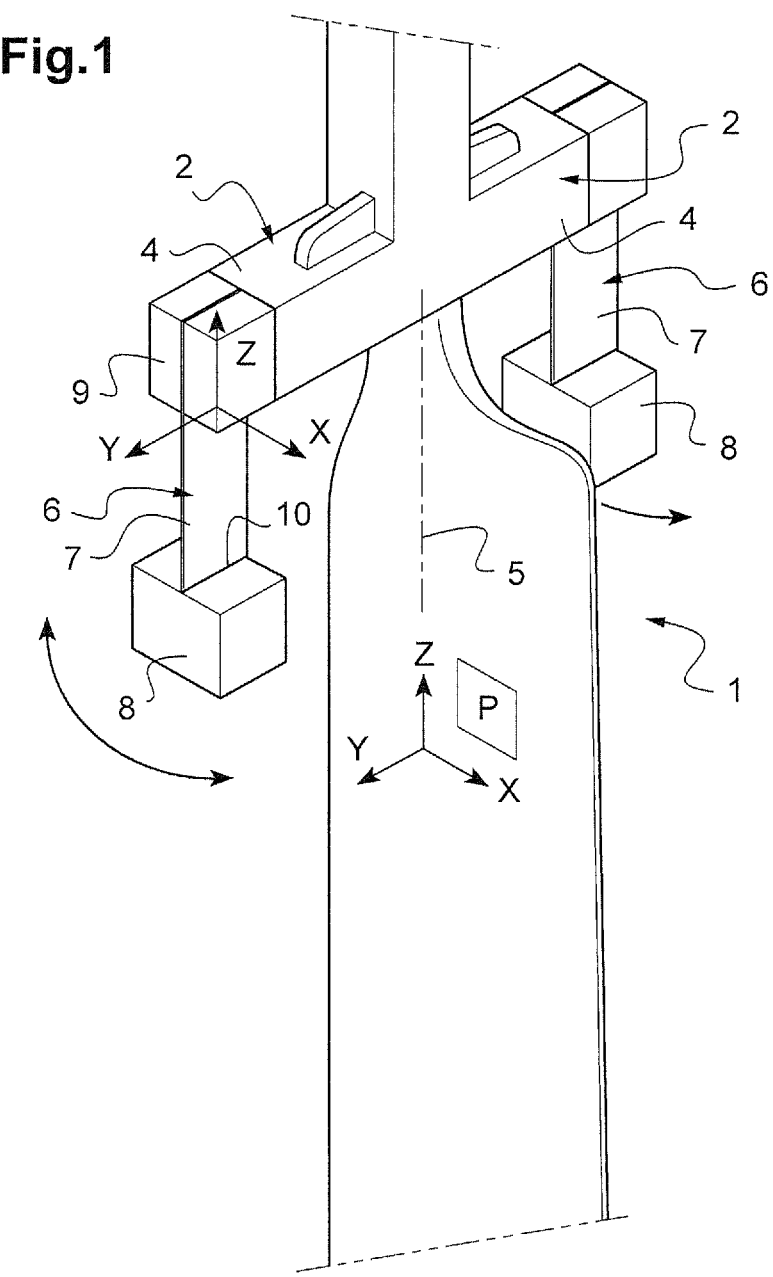
FIG. 1 is a perspective view of a blade element in a first variant of compensation weights of the invention.

Elements present in more than one of the figures may be given the same references in each of them.

DETAILED DESCRIPTION OF THE INVENTION

It should be observed that three mutually orthogonal directions X, Y, and Z are shown in FIGS. 1, 2, and 3.

As shown in FIG. 1, the direction of the axis Z is referred to as longitudinal insofar as it corresponds to the direction in which the longest dimension of a blade element 1 lies. Thus, the term "length" is used below relative to a longitudinal dimension of the blade element 1 of the rotor in said longitudinal direction of the axis Z. In addition, as a result of the shape of said rotor, a first main inertia axis 5 of said blade element 1 is parallel to the longitudinal direction of the axis Z.

The two other directions along the axes X and Y are said to be transverse. The axes X and Z serve in particular to describe a plane P in which a deformable portion of a compensation weight is free to move.

As shown, each blade element 1 comprises two compensation weights 2, each comprising a respective projection 4 extending from the plane P that is substantially perpendicular to the main inertia axis 5.

In this variant of FIG. 1, a deformable portion 6 of the compensation weight 2 comprises a flexible strip 7 having a first end 9 that is secured to the projection 4 and a second end 10 that is secured to a flyweight 8. Such a flyweight 8 can then make a rotary movement in the plane P. In other words, the flyweight 8 is secured in revolute joint of axis Y relative to the projection 4 of the blade element 1.

The flyweights make it possible to produce static and dynamic torque in the same direction around the pitch axis. Thus, it is advantageous to fit the deformable portions of the compensation weights with angular abutments that are useful in particular when stopped in order to avoid interference with the rudder bar being operated while starting or stopping stages of the rotorcraft.

As shown in FIG. 2, and in another variant of the invention, the deformable portion 16 may present another shape and, for example, it may comprise a rigid arm 17 having its first end 19 pivotally connected to a projection 14 of the compensation weight 12 so as to pivot about the axis Y. Such a revolute joint may in particular be provided by means of a bearing such as a ball-bearing or a bronze bushing in order to limit friction.

As shown, these projections 14 emerge substantially perpendicularly to a main inertia axis 15. In addition, a pin may be screw-fastened in the projections 14 to form the axis of the revolute joint between the rigid arm 17 and each projection 14.

The second end 20 of the rigid arm 17 is secured to a flyweight 18. As shown diagrammatically in FIG. 2, such a flyweight 18 can form a single-piece unit together with the rigid arm 17.

However, in other variants (not shown), it may also be envisaged to enable the flyweight 18 to be replaced independently of the rigid arm 17. Under such circumstances, reversible securing means, such as screws or bolts are used to form the rigid-type joint between the flyweight 18 and the rigid arm 17.

As shown in FIG. 3, only one of the projections 14 of the blade element 11 needs to be fitted with a deformable portion 16. In the invention, it is possible to adapt the number, the shape, the weight, the length, and the position of the deformable portions of a blade element so as to make it possible to attenuate vibration at various frequencies and in particular at frequencies corresponding to those of the speed of rotation of the tail rotor.

By way of example, by using a length of rigid arm that is substantially equal to the length of the spacing corresponding to the distance between the axis of the revolute joint of the arm and the axis of the revolute joint of the blade element, certain kinds of vibration can be attenuated. As a result, the forces in the pitch rod of each blade element are significantly reduced with, for example, a reduction of about 30%.

In addition, with suitable deformable portions and under steady conditions it is possible to obtain efficiency that is twice that obtained using conventional Chinese weights. Consequently, it is possible to reduce the overall weight of the rotor and the induced dynamic forces.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A rotorcraft tail rotor comprising at least two blade elements, each blade element having a chord and being suitable for pivoting about a collective pitch variation axis Z in order to vary the collective pitch of each blade element of the tail rotor, each blade element including at least one compensation weight comprising a projection extending transverse to the chord of the blade element along a transverse axis Y that is substantially perpendicular to the chord of the blade element, the projection being fixed relative to the blade element;

wherein the at least one compensation weight includes a deformable portion that is movable relative to the projection in a plane P that is substantially perpendicular to the transverse axis Y and substantially parallel to the chord of the blade element.

2. The tail rotor according to claim 1, wherein the projection is solid and the deformable portion comprises a flyweight that is movable in rotation at least in part about the transverse axis Y.

3. The tail rotor according to claim 1, wherein the deformable portion comprises a flexible strip.

4. The tail rotor according to claim 3, wherein the flexible strip emerges from the projection in a radial direction relative to the axis of rotation of the rotor.

5. The tail rotor according to claim 3, wherein the flexible strip comprises:

a first end secured to the projection by a first joint of the rigid type; and a second end secured to the flyweight by a second joint of the rigid type.

6. The tail rotor according to claim 1, wherein the deformable portion comprises a rigid arm.

7. The tail rotor according to claim 6, wherein the rigid arm comprises:

a first end constrained to revolute joint with the projection; and a second end secured to the flyweight by a joint of the rigid type.

8. The tail rotor according to claim 1, wherein the deformable portion has a length lying in the range 0.05 m to 0.09 m.

9. The tail rotor according to claim 1, wherein the flyweight has a weight lying in the range 100 g to 200 g.

10. A rotorcraft including a tail rotor according to claim 1.

11. A method of statically and dynamically balancing a rotorcraft tail rotor comprising at least two blade elements, each blade element having a chord and including at least one compensation weight comprising a projection extending transverse to the chord of the blade element along a transverse axis Y that is substantially perpendicular to the chord of the blade element, the projection being fixed relative to the blade element;

wherein the method comprises a step in which the at least one compensation weight is fitted with a deformable portion that is movable relative to the projection in a plane P that is substantially parallel to the chord of the blade element and substantially perpendicular to the transverse axis Y.

12. A rotorcraft tail rotor comprising: at least two blade elements, each of the blade elements having a chord and being pivotable about a collective pitch variation axis Z to vary the collective pitch of each of the blade elements of the tail rotor, each of the blade elements including a compensation weight comprising a projection extending along a transverse axis Y substantially perpendicular to the chord of a respective one of the blade elements, the projection being fixed relative to the blade element;

the compensation weight including a deformable portion movable relative to the projection in a plane P that is substantially perpendicular to the transverse axis Y and substantially parallel to the chord of the respective blade element.

13. The tail rotor according to claim 12, wherein the projection is solid and the deformable portion is movable in rotation relative to the projection at least in part about the transverse axis Y.

14. The tail rotor according to claim 12, wherein the deformable portion comprises a flexible strip and a flyweight.

15. The tail rotor according to claim 14, wherein the flexible strip extends from the projection to the flyweight in a radial direction relative to the axis of rotation of the rotor, the flyweight being movable in rotation relative to the projection at least in part about the transverse axis Y.

16. The tail rotor according to claim 14, wherein the flexible strip comprises:

a first end secured to the projection by a first rigid joint; and a second end secured to the flyweight by a second rigid joint.

17. The tail rotor according to claim 12, wherein the deformable portion comprises a rigid arm.

18. The tail rotor according to claim 17, wherein the rigid arm comprises:

a first end constrained to revolute joint with the projection; and a second end secured to the flyweight by a rigid joint.

19. The tail rotor according to claim 12, wherein the deformable portion has a length of 0.05 m to 0.09 m.

20. The tail rotor according to claim 12, wherein the flyweight has a weight of 100 g to 200 g.

* * * * *